United States Patent
Wolfe et al.

(10) Patent No.: US 9,262,628 B2
(45) Date of Patent: Feb. 16, 2016

(54) OPERATING SYSTEM SANDBOX

(75) Inventors: Andrew Wolfe, Los Gatos, CA (US); Thomas M. Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 1157 days.

(21) Appl. No.: 12/557,845

(22) Filed: Sep. 11, 2009

(65) Prior Publication Data

US 2011/0067105 A1 Mar. 17, 2011

(51) Int. Cl.
*G06F 21/53* (2013.01)
*G06F 11/30* (2006.01)
*G06F 9/455* (2006.01)

(52) U.S. Cl.
CPC .............. *G06F 21/53* (2013.01); *G06F 11/302* (2013.01); *G06F 11/3072* (2013.01); *G06F 11/3089* (2013.01); *G06F 2009/45587* (2013.01)

(58) Field of Classification Search
CPC .......... G06F 21/53; G06F 2009/45587; G06F 11/302; G06F 11/3072; G06F 11/3089
USPC ................................ 726/22–25; 713/187–189
See application file for complete search history.

(56) References Cited

U.S. PATENT DOCUMENTS

| | | | |
|---|---|---|---|
| 5,974,549 A * | 10/1999 | Golan .............................. | 726/23 |
| 6,199,181 B1 * | 3/2001 | Rechef et al. .............. | 714/38.13 |
| 2006/0174078 A1 * | 8/2006 | Robison ........................ | 711/163 |
| 2008/0127348 A1 * | 5/2008 | Largman et al. ................ | 726/24 |
| 2009/0222922 A1 * | 9/2009 | Sidiroglou et al. ............. | 726/23 |
| 2010/0031358 A1 * | 2/2010 | Elovici et al. ................... | 726/24 |
| 2011/0047543 A1 * | 2/2011 | Mohinder ........................ | 718/1 |

* cited by examiner

*Primary Examiner* — Chau Le
*Assistant Examiner* — Gary Lavelle
(74) *Attorney, Agent, or Firm* — Moritt Hock & Hamroff LLP; Steven S. Rubin, Esq.

(57) ABSTRACT

An operating system sandbox may include an operating system isolation module configured to restrict an operating system from transmitting machine-readable data and/or machine-readable instructions to an application, based on at least one predefined rule corresponding to abnormal operating system behavior.

19 Claims, 6 Drawing Sheets

OPERATING SYSTEM SANDBOX

BACKGROUND

The present disclosure is directed to operating system sandbox systems and methods and, more particularly, to operating system sandboxes configured to isolate an operating system from an application.

BRIEF DESCRIPTION OF THE SEVERAL VIEWS OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and, therefore, are not to be considered limiting of its scope, the disclosure will be described with additional specificity and detail through use of the accompanying drawings.

In the drawings.

DETAILED DESCRIPTION

Figure 1:
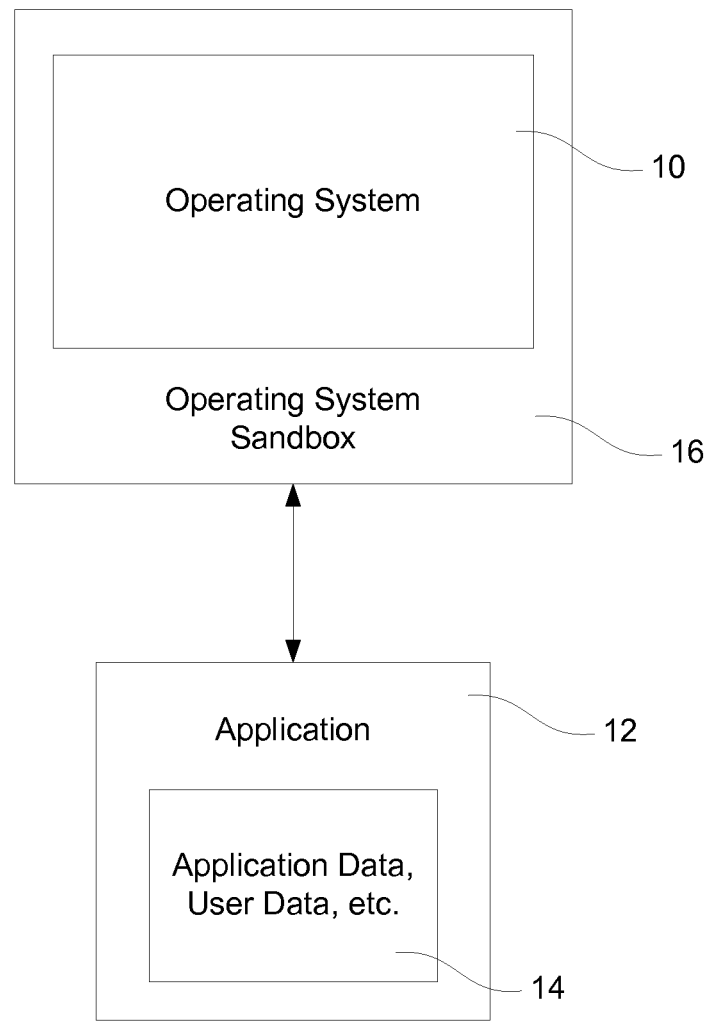
FIG. 1 is a schematic diagram of an example operating system sandbox architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods and systems related to an operating system sandbox for isolating an operating system from harming an application and/or data associated with the application. An example embodiment generally relates to an operating system sandbox architecture and a method for implementing the operating system sandbox.

Generally, a sandbox may create an isolated operating environment in which applications, operating systems and/or code may be executed or installed without permanently modifying a computer system. An isolated virtual environment may allow for controlled execution and/or testing of untrusted applications, operating systems and/or code.

The present disclosure contemplates that a sandbox may be a security mechanism for isolating applications, code and/or data from other applications, code and/or data for security reasons, among others. Such mechanisms may be implemented as applets, virtualized system environments, virtual machines and other similar mechanisms. The present disclosure further contemplates that a sandbox may be utilized to execute untested code or untrusted applications from unverified third-parties, suppliers and/or untrusted users. In such cases, a sandbox may provide a highly-controlled set of limited resources for applications, code and/or data to be executed and/or processed in, such as temporary storage on a hard disk or memory. Many, if not all, interactions between an operating system and an application may be heavily restricted or disallowed.

The present disclosure contemplates that an operating system may be vulnerable and may be corrupted and/or harmed due to a virus, worm, code exploit or other similar attack. Further, a corrupted operating system may be harmful to applications and/or data associated with the operating system. The present disclosure contemplates that a sandbox that isolates the operating system may be effective in protecting the applications and/or data from being harmed. The present disclosure also contemplates that an operating system sandbox may operate as if an operating system is potentially dangerous to the applications and/or data in communication with the operating system.

FIG. 1 is a schematic diagram of an example operating system sandbox architecture that is arranged in accordance with at least some embodiments of the present disclosure. As shown in FIG. 1, the example operating system sandbox architecture may include an operating system 10, an application 12 (having associated application data, user data and/or other similar data 14) and an operating system sandbox 16. In this example, the operating system 10 may operate within the operating system sandbox 16. The application 12 and associated data 14 may be operably connected to the operating system sandbox 16. In this manner, the operating system 10 may be isolated from the application 12 and the associated application data, user data and other similar data 14.

Figure 2:
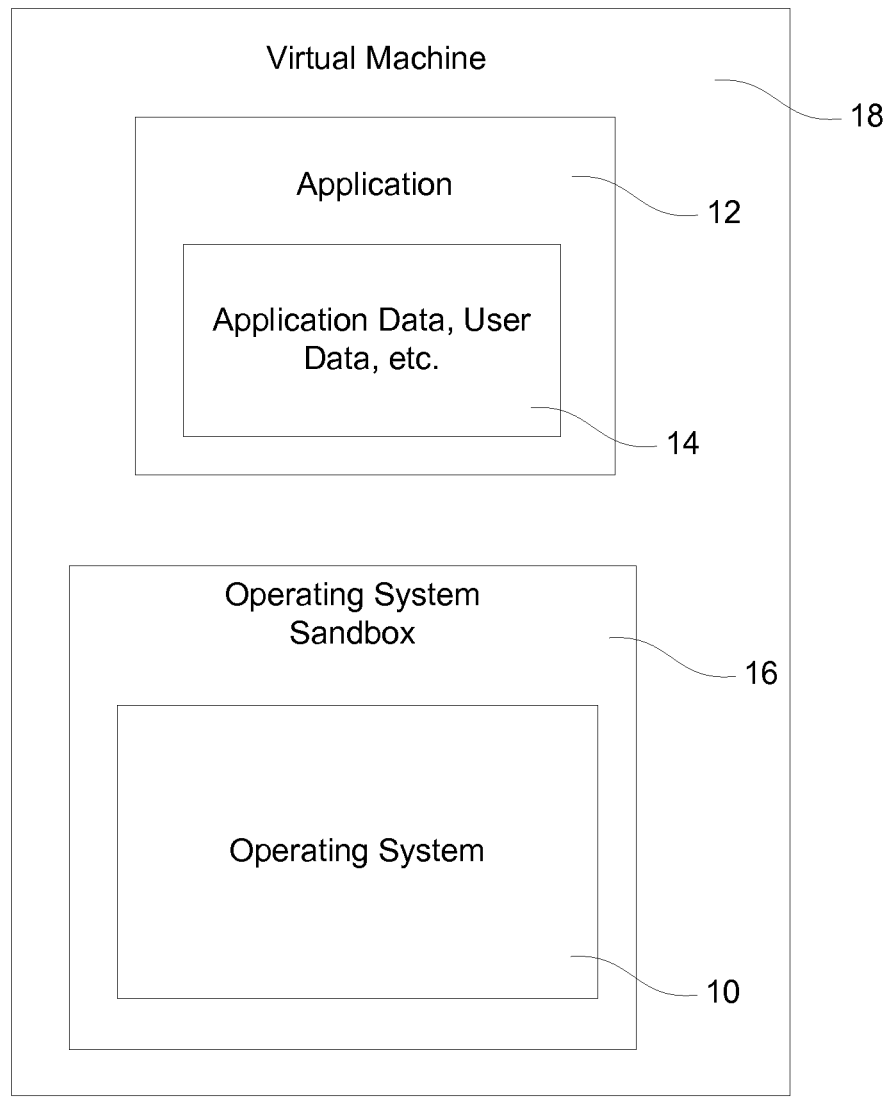
FIG. 2 is another schematic diagram of an example operating system sandbox architecture.

FIG. 2 is another schematic diagram of an example operating system sandbox architecture that is arranged in accordance with at least some embodiments of the present disclosure. As shown in FIG. 2, the example operating system sandbox architecture may include an operating system 10, an application 12 (having associated application data, user data and/or other similar data 14), an operating system sandbox 16, all operating within one or more virtual machines (or VMs) 18. In this example, the operating system 10 may operate within the operating system sandbox 16. The application 12 and associated data 14 may be operably connected to the operating system sandbox 16 by utilizing VM 18. In this example, the application 12 and the operating system 10 may be operating within the VM 18. In this manner, the operating system 10 may be isolated from the application 12 and the associated application data, user data and other similar data 14.

A VM may generally be described as an isolated virtualization or reproduction of a real machine (such as a computer system, for example). VMs may include system VMs, process VMs, other similar VMs and/or a combination thereof. A system VM (such as MICROSOFT® Virtual PC, for example) may provide a complete system platform configured to support the execution of an operating system. A process VM (such as a Java Virtual Machine, for example) may provide a platform configured to support the execution of an application. In one example, a process VM may support a single process. VMs may be implemented as software being executed on a computer system, where the VMs may be limited to the resources provided by the VM.

In some examples, the operating system sandbox may exist as part of a hypervisor process that may provide the VM to the operating system. Calls to operating system functions (including application programming interface (API) calls and interrupts, for example) may be intercepted by a virtualization layer within the hypervisor. An application-provided return pointer may be stored for subsequent use. Data structures may then be established in hypervisor-allocated memory space to store initial system and/or application status. Hardware monitors may be initialized to measure specific operating system activity during the operating system call. Alternatively, the status of hardware monitors may be read and/or stored in hypervisor-allocated memory space to be compared with post-operating system-call values. The operating system sandbox layer may (based on the type and/or nature of the operating system call) protect portions of the application address space to prevent operating system access. In some examples, the operating system may be permitted complete access to the application memory space. In some embodiment, hypervisor memory protection mechanisms may be configured such that any access to application memory space may be intercepted and tested before the access is granted. Control may then be passed to the operating system at an entry point associated with the operating system function, thus providing its own return pointer to the sandbox.

When the operating system returns control to the sandbox, the sandbox may perform any one of numerous operational tests. These tests may include checking return parameters, checking operating system data structures, checking application data structures, checking hardware monitors or other similar tests. If the tests are acceptable, control may be returned to the application using the previously stored return pointer.

Since, in some examples, the trusted hypervisor intervenes in all protected communications between the operating system and the operating system, the hypervisor may potentially detect any irregularities or anomalous behaviors. This may protect application data from many types of operating system infections or malware.

Multiple VMs may operate on the same physical machine where the physical machine's resources may be shared among two or more VMs. For example, one VM operating on a physical machine may execute an operating system sandbox, while another VM operating on the same physical machine may execute an application. In one physical machine architecture, two (or more) VMs may communicate via a hypervisor and/or VM monitor. In another physical machine architecture, two (or more) VMs may be in direct communication via shared memory. In such an architecture, the operating systems executing in the VMs may be enlightened (e.g. aware of the fact they are not running on physical hardware).

Figure 3:
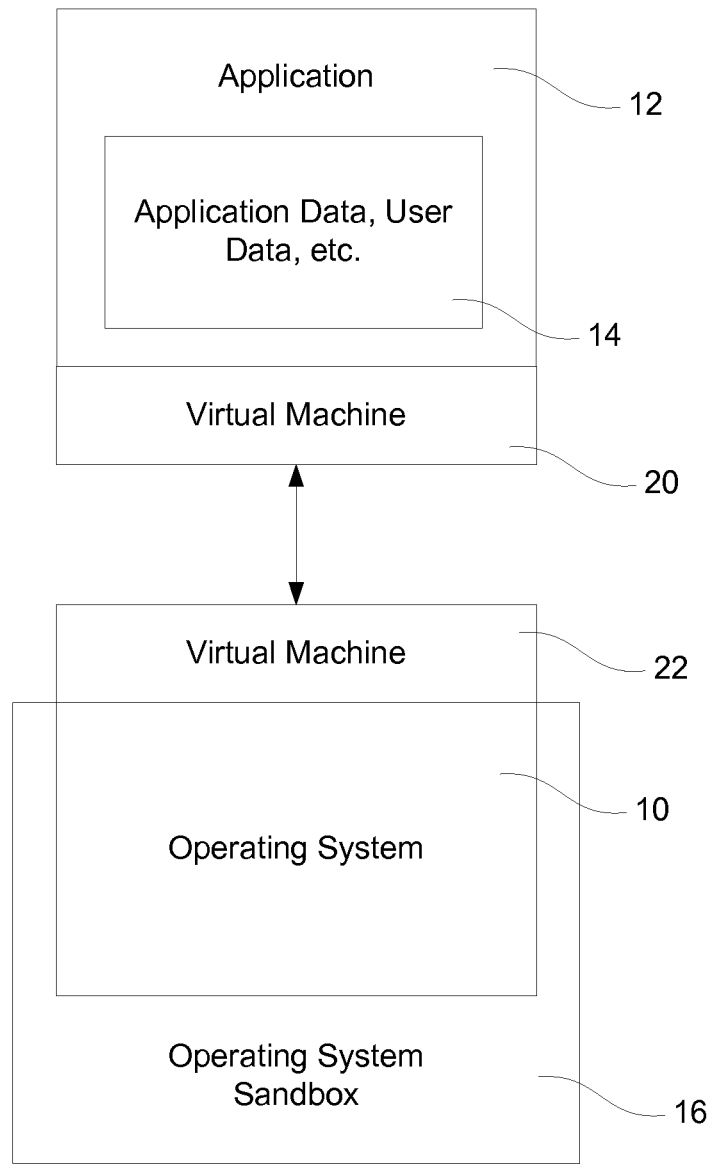
FIG. 3 is another schematic diagram of an example operating system sandbox architecture.

FIG. 3 is another schematic diagram of an example operating system sandbox architecture that is arranged in accordance with at least some embodiments of the present disclosure. As shown in FIG. 3, the example operating system sandbox architecture may include an operating system 10, an application 12 (having associated application data, user data and/or other similar data 14), an operating system sandbox 16 and VMs 20, 22. In this example, the operating system 10 may operate within the operating system sandbox 16. The application 12 and associated data 14 may be operably connected to the operating system sandbox 16 by utilizing VM 20 and VM 22. In this example, the application 12 may be operating within VM 20, while the operating system 10 may be operating within VM 22. In this manner, the operating system 10 may be isolated from the application 12 and the associated application data, user data and other similar data 14.

Figure 4:
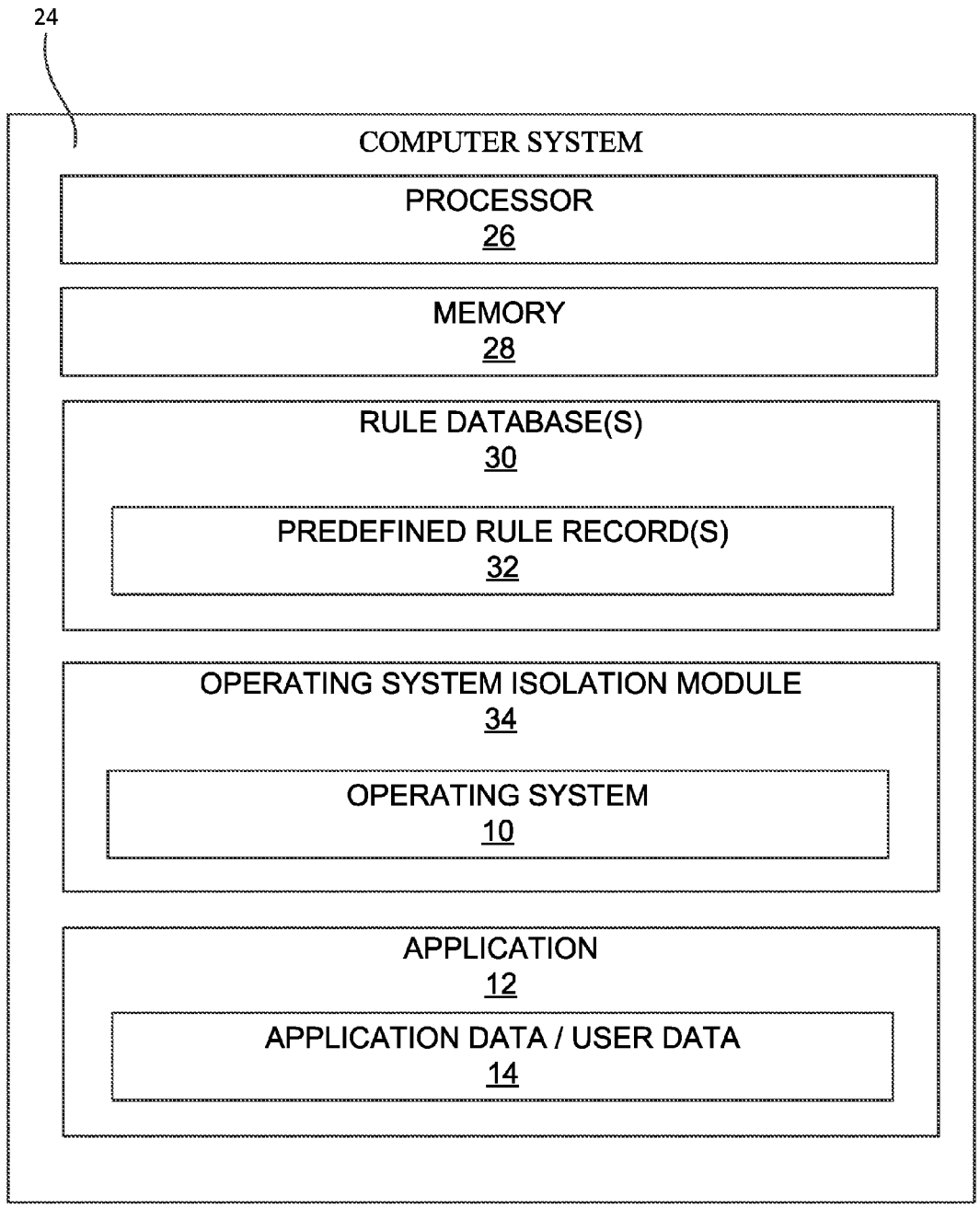
FIG. 4 is another schematic diagram of an example operating system sandbox architecture.

FIG. 4 is another schematic diagram of an example operating system sandbox architecture that is arranged in accordance with at least some embodiments of the present disclosure. As shown in FIG. 4, the example operating system sandbox architecture may operate on a special purpose computer system 24. The computer system 24 may include a processor 26, a memory 28 and a rule database 30 having associated predefined rule records 32. The computer system 24 may also include an operating system isolation module 34 (e.g. an operating system sandbox module), an operating system 10, an application 12 (having associated application data, user data and/or other similar data 14). In this example, the operating system 10 may operate within the operating system isolation module 34, thus isolating the operating system 10 from the application 12 and associated data 14.

In an example embodiment, the operating system isolation module 34 may be configured to protect an application 12 from being harmed by isolating the operating system 10 from the application 12. In one example, such protection may include indicating that the operating system 10 is operating in an abnormal manner. In another example, protection may include shutting down or terminating the operating system 10 and/or the application 12. In this example, the operating system 10, the operating system isolation module 34 and/or the application 12 may be implemented in one or more VMs or in one or more physical resources. Other examples may protect the application 12 by any number of predetermined operations to perform upon detection of abnormal operating system behavior.

In one example, the operating system isolation module 34 may receive data, commands and/or instructions from the operating system 10 without the operating system 10 having knowledge that it transmitted data, commands and/or instructions to an operating system isolation module 34. In other words, the operating system 10 may have no knowledge of the operating system isolation module's 34 existence.

The operating system 10 may attempt to provide data to the application 12. Such data may include the time, the identification of network ports, and/or port usage, for example. By implementing the operating system sandbox architecture, the operating system sandbox 16 may detect abnormal operating system behavior. Such abnormal behavior may include unusually high data flux or repeated input/output thread usage at a high rate, for example.

The operating system sandbox 16 may also monitor a variety of indicators of abnormal operating system behavior, which may be defined in one or more rule databases. In one example, a rule database may include predefined rules related to operating system behavior, where the predefined rules include assertions, system calls, signatures of known attackers, patterns of known attackers, anomalies, rates and/or temporal shifts, among others.

In one example, a predefined rule may be associated with assertions and/or system calls. The operating system sandbox 16 may monitor system calls that are transmitted to the operating system 10 and the information returned to the operating system sandbox 16. The operating system sandbox 16 may analyze the returned information for certain semantic assertions that may and/or must be true. For example, a fork system call may be expected to return two processes. One process may be expected to be returned with an original process identification (PID), while another process may be expected to be returned with a new PID. In this example, any returned information that is different from such expectations may signal a potential problem. In another example, a list of assertions may be generated based on different operating system 10 documentation. For example, one set of assertions may be generated based on a Microsoft® Windows operating system and another set of assertions may be generated based on an Apple®/Unix operation system.

In one example, a predefined rule may be associated with signatures, patterns and/or profiles associated with known attackers or malicious code. In one embodiment, the operating system sandbox 16 may monitor memory for known attack signatures or patterns. Such monitoring may include scanning the memory continuously and/or at a predetermined time interval. The operating system sandbox 16 may analyze the signatures, patterns and/or profiles if they are associated with known attack methods. If certain signatures, patterns and/or profiles are detected, the operating system 10 may be compromised and trying to harm the application by triggering a stack overflow or some other known application vulnerability, for example.

In one example, a predefined rule may be associated with anomalous data. In one embodiment, the operating system sandbox 16 may monitor for anomalous data, such as too much network traffic or traffic to a suspicious port, for example. In one example, the operating system sandbox 16 may check memory protection. For example, one rule may provide that no application other than a predefined application 12 and the operating system 10 may be to read and/or access the application data 14 stored in memory. In another example, a predefined rule may be associated with data rates and temporal shifts of data.

In another embodiment, the operating system sandbox 16 (including the rule database 30) may be programmable and updateable on-the-fly. Further, the operating system sandbox 16 may utilize a cooperative attack detection across multiple machines or VMs. For example, operating system sandbox 16 may share anomalous data with other predefined trusted applications to generate an improved sense of emerging attack patterns.

Figure 5:
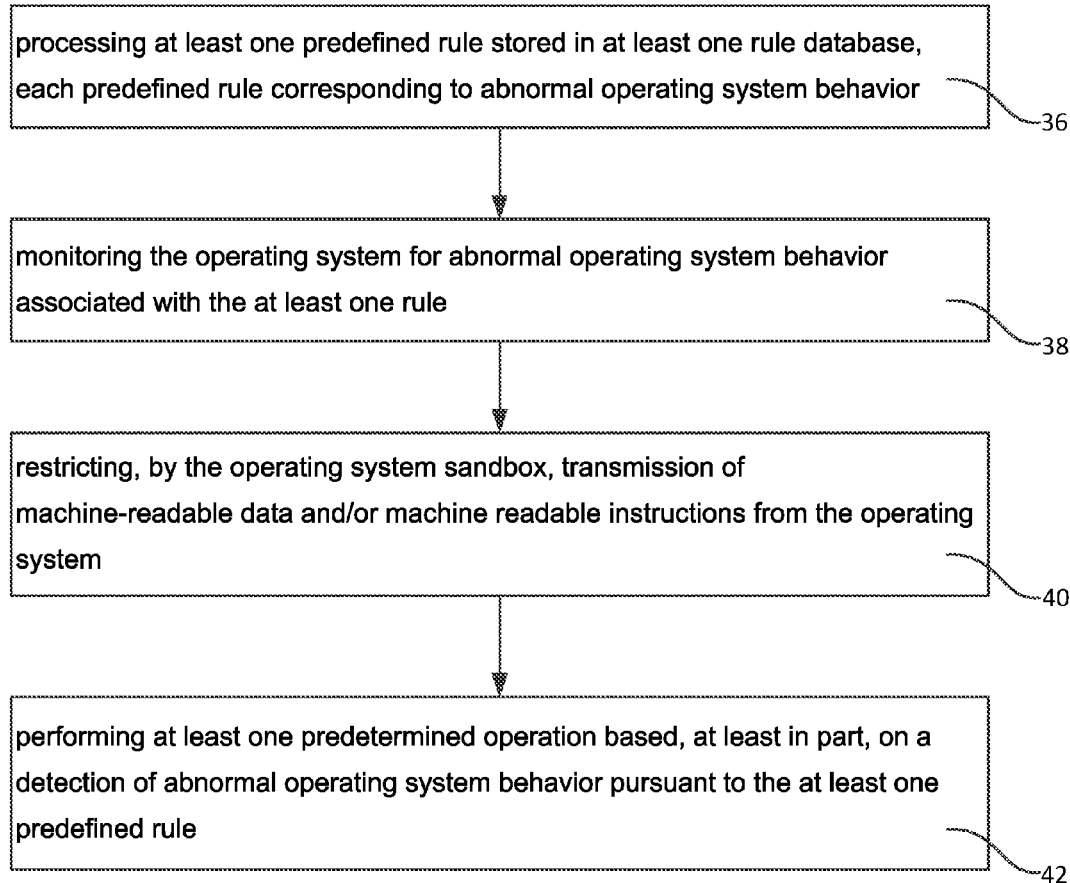
FIG. 5 is a flowchart showing the operation of another example operating system sandbox; and, FIG. 6 is a block diagram illustrating an example computing device that is arranged for operating system sandbox implementations, all arranged in accordance with at least some embodiments of the present disclosure.

FIG. 5 is a flowchart showing the operation of another example operating system sandbox that is arranged in accordance with at least some embodiments of the present disclosure. The example embodiments may include one or more of processing operations 36, 38, 40 and 42.

Processing begins at operation 36, which may include processing at least one predefined rule stored in at least one rule database, each predefined rule corresponding to abnormal operating system behavior.

Processing flows from operation 36 to operation 38. Operation 38 may include monitoring the operating system for abnormal operating system behavior associated with the at least one rule.

Continuing from operation 38 to operation 40, operation 40 may include restricting, by the operating system sandbox, transmissions of machine-readable data and/or machine-readable instructions from the operating system.

Proceeding to operation 42, operation 42 may include performing at least one predetermined operation based, at least in part, on a detection of abnormal operating system behavior pursuant to the at least one predefined rule.

In an example embodiment, a storage medium (having computer-readable instructions) may be configured to implement the method of FIG. 5.

In another example embodiment, the monitoring operation may include monitoring operating system calls transmitted to the operating system from the operating system sandbox, receiving returned information from the operating system in response to the operating system calls, and analyzing the returned information based, at least in part, on the rule.

In one embodiment, the monitoring operation may include monitoring a memory device for a signature and/or pattern of a known attacker or malicious code, and analyzing the signature and/or pattern based, at least in part, on the rule.

In another embodiment, the monitoring operation may include monitoring data being transmitted to and from the operating system and analyzing the data based, at least in part, on the rule.

Figure 6:
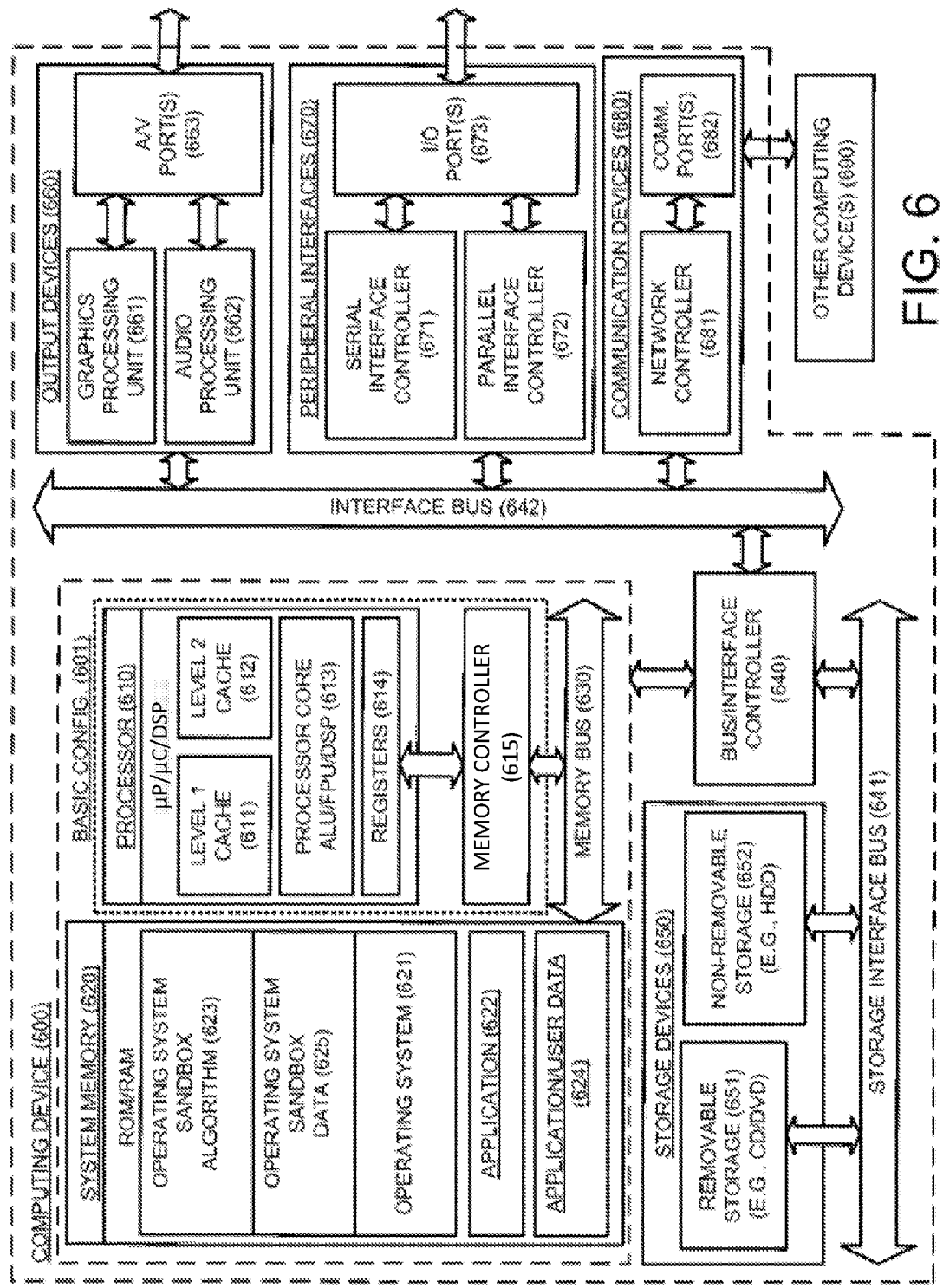

With reference to FIG. 6, depicted is a block diagram illustrating an example computing device 600 that is arranged for operating system sandbox implementations arranged in accordance with at least some embodiments of the present disclosure. In a very basic configuration 601, computing device 600 typically includes one or more processors 610 and system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 may include one more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, application and/or user data 624, an operating system sandbox algorithm 623 and operating system sandbox data 625. Operating system sandbox algorithm 623 may be implemented to efficiently isolate the operating system 621 from the application 622 and application/user data 624. Operating system sandbox data 625 may include data obtained from monitoring the operating system 621 and detecting abnormal operating system 621 behavior. In some embodiments, operating system sandbox algorithm 623 may be arranged to operate with operating system sandbox data 625 to effectuate the isolation of the operating system 621 from the application 622 and application/user data 624. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication via one or more communication ports 682. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An operating system sandbox effective to isolate an operating system from an application, the operating system sandbox comprising:
   a computing system that includes an isolation module different from the operating system and different from the application, wherein the isolation module is operable separate from the application, and is configured to control the operating system sandbox to selectively restrict an operating system from transmitting machine-readable data and instructions to the application, and to selectively allow the operating system to transmit machine-readable data and instructions to the application; and
   at least one rule database operably connected to the isolation module, each rule database configured to store at least one predefined rule corresponding to abnormal operating system behavior associated with communications from the operating system to the application, wherein the abnormal operating system behavior includes at least one of data flux, input thread usage, output thread usage, signatures, patterns, assertions, anomalies, rates and temporal shifts associated with communications from the operating system to the application;
   wherein the isolation module is further configured to:
      allow the operating system to transmit application data to the operating system sandbox, wherein the application data includes machine-readable data and instructions, and the application data is associated with the application;
      receive the application data transmitted by the operating system;
      store the application data transmitted by the operating system in memory allocated to the operating system sandbox;
      analyze the application data stored in the memory allocated to the operating system sandbox;
      based on the analysis, identify abnormal operating system behavior associated with the transmission of the application data from the operating system to the operating system sandbox pursuant to the at least one predefined rule; and
      in response to the identification of the abnormal operating system behavior associated with the transmission of the application data from the operating system to the operating system sandbox, determine whether to transmit the application data received from the operating system from the memory allocated to the operating system sandbox to the application based, at least in part, on the identification of abnormal operating system behavior associated with the transmission of the application data from the operating system to the operating system sandbox pursuant to the at least one predefined rule.

2. The operating system sandbox of claim 1, wherein the isolation module and the application are executed in a virtual machine.

3. The operating system sandbox of claim 2, wherein the isolation module is executed in a first virtual machine, and wherein the application is executed in a second virtual machine.

4. The operating system sandbox of claim 1, wherein the isolation module is further configured to monitor the operating system for at least one predefined abnormal operating system indicator.

5. The operating system sandbox of claim 4, wherein the at least one predefined abnormal operating system indicator comprises at least one of an assertion, a system call, a signature of a known attacker, a pattern of a known attacker, a data anomaly, a rate and/or a temporal shift.

6. The operating system sandbox of claim 1, wherein the operating system is configured to transmit the application data to the operating system sandbox without knowledge of the isolation module.

7. The operating system sandbox of claim 1, wherein the isolation module is further configured to monitor a memory device for a signature of a known attacker.

8. The operating system sandbox of claim 7, wherein the isolation module is configured to scan the memory device at a predetermined interval.

9. The operating system sandbox of claim 1,
   wherein the isolation module is further configured to operate on a plurality of computer systems, each of the plurality of computer systems having an operating system operating thereon; and
   wherein the plurality of computer systems are configured to cooperatively monitor their respective operating systems for abnormal operating system behavior pursuant to the at least one predefined rule.

10. The operating system sandbox of claim 9,
    wherein the plurality of computer systems are operably connected; and
    wherein the plurality of computers systems are configured to share data related to abnormal operating system behavior.

11. The operating system sandbox of claim 10, wherein the data related to abnormal operating system behavior is associated with the at least one predefined rule.

12. The operating system sandbox of claim 11, wherein the data related to abnormal operating system behavior is associated with a rule not defined as the at least one predefined rule.

13. A method to isolate an operating system from an application the method comprising, by an operating system sandbox:
    processing, by an isolation module, at least one predefined rule stored in at least one rule database, each predefined rule corresponding to abnormal operating system behavior associated with communications from the operating system to the application, wherein the isolation module is operable separate from the application, and wherein the abnormal operating system behavior includes at least one of data flux, input thread usage, output thread usage, signatures, patterns, assertions, anomalies, rates and temporal shifts associated with communications from the operating system to the application;
    allowing, by the isolation module, the operating system to transmit application data to the operating system sandbox, wherein the application data includes machine-readable data and instructions, and the application data is associated with the application;
    receiving, by the isolation module, the application data transmitted by the operating system;
    storing, by the isolation module, the application data transmitted by the operating system in memory allocated to the operating system sandbox;

analyzing, by the isolation module, the application data stored in the memory allocated to the operating system sandbox;

based on the analysis, identifying, by the isolation module, abnormal operating system behavior associated with the transmission of the application data from the operating system to the operating system sandbox pursuant to the at least one rule;

in response to the identification of the abnormal operating system behavior associated with the transmission of the application data from the operating system to the operating system sandbox, determining, by the isolation module, whether to transmit the application data received from the operating system from the memory allocated to the operating system sandbox to the application based, at least in part, on a detection of abnormal operating system behavior associated with the transmission of the application data from the operating system to the operating system sandbox; and performing, by the isolation module, at least one predetermined operation based, at least in part, on the identification of the abnormal operating system behavior associated with the transmission of the application data from the operating system to the operating system sandbox pursuant to the at least one predefined rule.

14. The method of claim 13, wherein the at least one predetermined operation comprises at least one of terminating the operating system, terminating the application, notifying an operating system user of the abnormal operating system behavior and/or notifying an application user of the abnormal operating system behavior.

15. The method of claim 13, further comprising:
monitoring operating system calls transmitted to the operating system from the operating system sandbox;
receiving returned information from the operating system in response to the operating system calls; and
analyzing the returned information based, at least in part, on the at least one rule.

16. The method of claim 13, further comprising: monitoring a memory device for at least one of a signature of a known attacker and a pattern of the known attacker; and
analyzing at least one of the signature and the pattern based, at least in part, on the at least one rule.

17. The method of claim 13, further comprising:
monitoring data being transmitted to and from the operating system; and
analyzing the data based, at least in part, on the at least one rule.

18. A non-transitory storage medium comprising machine-readable instructions stored thereon, which, when executed by one or more processing units, operatively enable a computing platform to:

process, by an isolation module, at least one predefined rule stored in at least one rule database, each predefined rule corresponding to abnormal operating system behavior associated with communications from an operating system to an application, wherein the isolation module is operable separate from the application, and wherein the abnormal operating system behavior includes at least one of data flux, input thread usage, output thread usage, signatures, patterns, assertions, anomalies, rates and temporal shifts associated with communications from the operating system to the application;

allow, by the isolation module, the operating system to transmit application data to the operating system sandbox, wherein the application data includes machine-readable data and instructions, and the application data is associated with the application;

receive, by the isolation module, the application data transmitted by the operating system;

store, by the isolation module, the application data transmitted by the operating system in memory allocated to the operating system sandbox;

analyze, by the isolation module, the application data stored in the memory allocated to the operating system sandbox;

based on the analysis, identify, by the isolation module, abnormal operating system behavior associated with the transmission of the application data from the operating system to the operating system sandbox pursuant to the at least one rule;

in response to the identification of the abnormal operating system behavior associated with the transmission of the application data from the operating system to the operating system sandbox, determine, by the isolation module, whether to transmit the application data received from the operating system from the memory allocated to the operating system sandbox to the application; and perform, by the isolation module, at least one predetermined operation based, at least in part, on the identification of the abnormal operating system behavior associated with the transmission of the application data from the operating system to the application pursuant to the at least one predefined rule.

19. The storage medium of claim 18, wherein the at least one predetermined operation includes at least one of termination of the operating system, termination of the application, notification of an operating system user of the abnormal operating system behavior and notification of an application user of the abnormal operating system behavior.

* * * * *